US012577935B2

(12) United States Patent
Enevoldsen et al.

(10) Patent No.: US 12,577,935 B2
(45) Date of Patent: Mar. 17, 2026

(54) ROTOR BLADE ACTIVE FLAP

(71) Applicant: Siemens Gamesa Renewable Energy A/S, Brande (DK)

(72) Inventors: Peder Bay Enevoldsen, Vejle (DK); Alejandro Gomez Gonzalez, Aarhus (DK); Morten Rams Quistgaard, Silkeborg (DK); Dillon Volk, Hamburg (DE)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/710,469

(22) PCT Filed: Feb. 23, 2023

(86) PCT No.: PCT/EP2023/054511
§ 371 (c)(1),
(2) Date: May 15, 2024

(87) PCT Pub. No.: WO2023/165884
PCT Pub. Date: Sep. 7, 2023

(65) Prior Publication Data
US 2025/0020103 A1      Jan. 16, 2025

(30) Foreign Application Priority Data
Mar. 4, 2022      (EP) ..................................... 22160126

(51) Int. Cl.
*F03D 7/02* (2006.01)
(52) U.S. Cl.
CPC ...... *F03D 7/0232* (2013.01); *F05B 2240/304* (2020.08); *F05B 2240/305* (2020.08)

(58) Field of Classification Search
CPC ... F03D 7/0232; F03D 1/06495; Y02E 10/72; F05B 2240/304; F05B 2240/305; F05B 2240/3052; F05B 2270/324
See application file for complete search history.

(56) References Cited

U.S. PATENT DOCUMENTS

2008/0292461 A1*  11/2008  Stiesdal ................ F03D 7/0232
                                                                416/223 R
2011/0110778 A1    5/2011  Lim et al.
(Continued)

FOREIGN PATENT DOCUMENTS

EP       1995455 A1    11/2008
EP       2708736 A2    3/2014
(Continued)

OTHER PUBLICATIONS

International Search Report and Written Opinion of the International Searching Authority mailed May 25, 2023 corresponding to PCT Application PCT/EP2023/054511 filed Feb. 23, 2023.
(Continued)

*Primary Examiner* — Chelsea E Stinson
*Assistant Examiner* — Eric A Lange

(57) ABSTRACT
The invention describes a wind turbine rotor blade active flap (1) comprising a primary body (1P) adapted for mounting to the trailing edge ($20_{TE}$) of a wind turbine rotor blade (20); a flap turning means (10, 11, 12) adapted to turn the active flap (1) between a neutral position ($R_0$), in which the active flap (1) directs airflow ($A_{20S}$, $A_{20P}$) towards the suction side ($P_{20S}$) of the rotor blade (20), and a working position ($R$-$R_{max}$), in which the active flap (1) directs airflow ($A_{20S}$, $A_{20P}$) towards the pressure side ($P_{20P}$) of the rotor blade (20); and a secondary body (1S) mounted to the primary body (1P) and configured to hold the active flap (1) in its neutral position ($R_0$). The invention further describes a wind turbine (2) comprising a number of rotor blades (20)
(Continued)

mounted to a hub; and an active flap (1) according to the invention, mounted to the trailing edge (20$_{TE}$) of each rotor blade (20).

14 Claims, 7 Drawing Sheets

(56) References Cited

U.S. PATENT DOCUMENTS

| | | | | |
|---|---|---|---|---|
| 2012/0169060 A1* | 7/2012 | Loh | F03D 1/0641 | |
| | | | 290/55 | |
| 2013/0266441 A1* | 10/2013 | Enevoldsen | F03D 1/0675 | |
| | | | 416/1 | |
| 2016/0369775 A1* | 12/2016 | Gonzalez | F03D 7/0236 | |
| 2018/0058424 A1* | 3/2018 | Egedal | F03D 7/0224 | |
| 2019/0234376 A1* | 8/2019 | Akay | F03D 1/0641 | |
| 2020/0011290 A1* | 1/2020 | Akay | F03D 7/022 | |

FOREIGN PATENT DOCUMENTS

| | | | | | |
|---|---|---|---|---|---|
| EP | | 3128169 A1 | 2/2017 | | |
| WO | WO-2011000628 A2 * | | 1/2011 | | F03D 7/0232 |
| WO | WO-2017025352 A1 * | | 2/2017 | | F03D 1/0633 |

OTHER PUBLICATIONS

Extended European Search Report dated Aug. 5, 2022 corresponding to EP Application 22160126.3 filed Mar. 4, 2022.

* cited by examiner

ROTOR BLADE ACTIVE FLAP

BACKGROUND

The aerodynamic performance of a wind turbine rotor blade can be improved or enhanced by an add-on such as a "blade-mounted active device" or "active flap" extending some distance along the trailing edge of a rotor blade, and shaped to augment or extend the suction surface and pressure surface of the rotor blade airfoil.

An imaginary plane that includes the chord plane of the rotor blade airfoil will divide space into two regions, a "suction side" that includes the suction surface of the airfoil, and a "pressure side" that includes the pressure surface of the airfoil. The function of an active flap may be described in terms of its ability to guide an airflow in a desired direction, e.g. towards the suction side or towards the pressure side: an airfoil shape with an active flap that results in airflow being deflected further from the suction side of the chord plane towards the pressure side (compared to that same airfoil shape without an active flap), achieves an increase in lift; an airfoil shape with an active flap that results in airflow being deflected further from the pressure side of the chord plane towards the suction side (compared to that same airfoil shape without an active flap) achieves a decrease in lift.

The purpose of a prior art active flap is to guide the airflow over the rotor blade in a desired manner to increase or decrease lift as required. For example, if the aerodynamic rotor of a wind turbine is to extract more energy out of the wind, suitable rotor blade pitch angles can be set to achieve a desired angle of attack, and the active flaps of the rotor blades can be turned to a suitable working position to increase lift by a desired amount. When load on the rotor blades is to be reduced or minimised, for example in order to avoid tower collision during high wind conditions, the active flaps can be turned to their neutral (or low-loaded) positions as the rotor blade approaches "6 o'clock". In its neutral position, an active flap should ideally not increase the lift forces and can instead be used to decrease lift forces.

The airflow passing over the surfaces of a rotor blade airfoil recombines at the trailing edge. However, the airflow passing over a prior art active flap can experience local acceleration in such a way that causes unintended pressure forces on the active flap due to the local geometry and curvature of the device itself. These local pressure forces can act in a direction that unintentionally deflects the aerodynamic surface towards the pressure side, and may hinder the intended operation, i.e. they may work against the intention of the current lift target level. The effect of this unintentional deflection of the active flap, even if only by a small amount, is to increase the lift force on the rotor blade. A prior art active flap may therefore be unable to maintain a low-lift position, leading to unexpected performance when the wind turbine controller issues commands to decrease the loading of the wind turbine.

It is therefore an object of the invention to provide an improved active device for a wind turbine rotor blade.

This object is achieved by the claimed active flap, by the claimed wind turbine and by the claimed method of operating a wind turbine.

DESCRIPTION

According to the invention, the active flap comprises a primary body adapted for mounting to the trailing edge of a wind turbine rotor blade; and a flap turning means adapted to turn the active flap between a neutral position and a working position. In its neutral position, during operation of the wind turbine rotor blade, the active flap will direct airflow over the surfaces of the rotor blade towards the suction side with the aim of reducing lift, and thereby reducing load on the rotor blade. In a working position, during operation of the wind turbine rotor blade, the active flap will direct airflow towards the pressure side with the aim of increasing lift, for example to allow the aerodynamic rotor to extract more energy from the wind. The inventive active flap is characterized by a secondary body that is mounted to the primary body and which is configured to hold or maintain the active flap in its neutral position. This shall be understood to mean that when the active flap has been intentionally turned to its neutral position, the secondary body guides the airflow over the rotor blade in such a way that the active flap is not passively—i.e. unintentionally-turned out of its neutral position.

The turning means of the active flap alters the shape of the active flap and therefore also alters the aerodynamic performance of the rotor blade. Any aerodynamic component mounted to a rotor blade with the purpose of improving its aerodynamic performance may be regarded as an "aerodynamic surface". In the following, any of the active flap, the primary body or the secondary body may be referred to as an aerodynamic surface. The term "airfoil" as used in the following shall be understood to comprise the rotor blade airfoil as well as the active flap.

The neutral position of the inventive active flap is a "low-lift" position, i.e. the airflow over both surfaces of the rotor blade will be deflected towards the suction side. Such a "low-lift" position may be desirable in certain situations, e.g. when a wind turbine is experiencing gusty wind conditions. Similarly, a "low-lift" position can be beneficial when a wind turbine is operating in its "constant-speed" region, i.e. striving to maintain its rated power output while minimizing loads on the wind turbine components in case of high turbulence cases. A "low-lift" position can even increase lift in the constant-speed region to increase the power output of the turbine in cases of low turbulence.

The inventive active flap makes a favourable contribution towards achieving these goals. In its neutral position, the active flap makes no contribution (or only a minimum contribution) to the lift force acting on the airfoil. In combination with a suitable pitch angle, the loads on the rotor blade can be reduced to a desired minimum in the situations described above.

The inventive blade-mounted active device ensures that its neutral position is maintained, even when the airflow over the rotor blade results in forces that would turn a prior art active flap out of its neutral position. An advantage of the inventive active flap is that, when deployed on a wind turbine rotor blade, its ability to maintain its neutral position makes it possible for the wind turbine controller to make full use of the entire position range of the flap. The ability of the inventive active flap to maintain its set position can ensure that any subsequent adjustment will result in the desired effect, since the wind turbine controller can assume that the active flap was still in the previously set position. In contrast, the position of a prior art active flap can depart from the neutral position owing to the local airflow behaviour described above, and any subsequent position adjustment of the prior art flap will not be accompanied by the expected effect.

According to the invention, the wind turbine comprises a generator arranged in a nacelle mounted on top of a tower;

a number of rotor blades mounted to a hub; and an embodiment of the inventive active flap mounted to the trailing edge of each rotor blade.

According to the invention, the method of operating such a wind turbine comprises a step of actuating the flap turning means of the active flap of a rotor blade to turn that active flap from a working position to its neutral position in order to decrease the lift force on that rotor blade, for example to ensure tower clearance during extreme wind conditions. The method further comprises a step of actuating the flap turning means of the active flap of a rotor blade to turn that active flap to a working position in order to increase the lift force acting on that rotor blade.

Particularly advantageous embodiments and features of the invention are given by the dependent claims, as revealed in the following description. Features of different claim categories may be combined as appropriate to give further embodiments not described herein.

As explained in the introduction, a plane including the rotor blade airfoil chord plane divides space into a "suction side" (which includes the suction surface of the airfoil) and a "pressure side" (which includes the pressure surface of the airfoil). At the trailing edge of the rotor blade, the inventive active flap guides the airflow in a specific manner: when the flap turning means has been actuated to place the active flap in its neutral position, the airflow over the rotor blade airfoil is deflected towards the suction side. In other words, in the neutral position of the active flap, the direction of the airflow—as it combines behind the trailing edge—is towards the suction side. The shape and structure of the inventive active flap results in an overall decrease in lift on the rotor blade in that airfoil region.

Since an airfoil is usually depicted with its pressure surface facing downwards, the effect of the inventive active flap may be described as guiding the airflow in an "upward" direction. This is in contrast to a prior art active flap which, in its neutral position, may be turned passively by the airflow, resulting in deflection of the airflow in a "downward" direction towards the pressure side.

An active flap of a wind turbine rotor blade airfoil can be regarded as a body that turns about a hinge, similar to the hinged flaps or ailerons known from the field of aeronautics. The active flap may therefore be described in terms of a "hinge moment", i.e. in terms of the force acting on the active flap to turn it about its "hinge". In the following, the term "positive hinge moment" shall be understood as a force that turns the active flap towards the suction side, and the term "negative hinge moment" shall be understood as a force that turns the active flap towards the pressure side. Of course, the flap turning means need not require an actual hinge in the accepted sense, and may be realized in any suitable manner as will be explained further below. The "flap turning means" may also be referred to as a "flap angle adjustment means" in the following, since actuation of the flap turning means results in an adjustment of the flap end angle, which can be defined for example as an angle subtended between a surface of the secondary body and a surface of the primary body.

In a particularly preferred embodiment, the secondary body is an essentially rectangular band with one long edge attached to the primary body so that the other long edge is the trailing edge of the airfoil. The secondary body is preferably shaped to achieve a positive hinge moment when the active flap is in its neutral position. In other words, the form of the secondary body is such that the airflow approaching the trailing edge is guided by the shape of the secondary body towards the suction side. This can be achieved by attaching a flat rectangular band to the primary body in such a way that the band is directed "upward", i.e. to subtend an angle to the plane separating the suction side from the pressure side.

In a further preferred embodiment of the invention, the suction surface of the secondary body exhibits a convex shape. In other words, when looking towards the suction surface of the rotor blade, the active flap presents a moderate or low convex curvature along the length of the secondary body. The effect of this shape is to keep the active flap in its neutral or low-lift position. The shape of the secondary body guides the airflow (recombining at the trailing edge) towards the suction side, and the resulting "upward" direction of the airflow at the trailing edge ensures that the active flap maintains its neutral position.

The thickness of the secondary body can be essentially uniform, so that the pressure surface of the secondary body exhibits a concave shape. In other words, when looking towards the pressure surface of the rotor blade, the active flap presents a shallow depression along the length of the secondary body.

As indicated above, the secondary body can have an essentially rectangular form. In a preferred embodiment, the trailing edge of the secondary body can have a serrated or saw-tooth form, since trailing edge serrations have been found to reduce the aerodynamic noise of a rotor blade.

In an alternative preferred embodiment of the invention, the secondary body comprises an auxiliary airfoil. In such an embodiment, the auxiliary airfoil can be positioned below the pressure surface of the primary body, and in the direction of the trailing edge of the airfoil. The auxiliary airfoil can be held by a strut or similar structure that extends from the pressure surface of the primary body. Similar to the rotor blade airfoil, the auxiliary airfoil has a suction surface and a pressure surface. By placing the auxiliary airfoil in a favourable position below the primary body, its surfaces can guide the airflow towards the suction side, and this re-direction of the airflow (passing over the suction surface of the rotor blade) results in an "upward" direction of the airflow at the trailing edge of the active flap. The upward force on an auxiliary airfoil forces the active flap "upwards", which in turn ensures that the active flap maintains its neutral position.

An auxiliary airfoil can be "passive", i.e. it can be realised as a rigid structure. In a preferred embodiment of the invention, the small trailing edge of an auxiliary airfoil can be augmented by an actuatable element such as a small edge flap or micro-tab which can change the shape of the auxiliary airfoil in order to adjust the direction of airflow. An actuator for the micro-tab or equivalent can be realised in any suitable manner, for example as a piezo-electric actuator.

In a further preferred embodiment of the invention, the secondary body combines the advantages of the elongate band and the auxiliary airfoil. For example, one or more auxiliary airfoils can be attached at intervals to the pressure surface of an elongate band that in turn is attached to the primary body.

The forces acting against the pressure side of an active flap of a wind turbine rotor blade could be countered by a robust metal hinge assembly along the junction between the rotor blade trailing edge and the active flap. However, any metal components can present a problem during an electric storm and must be incorporated into the rotor blade LPS. Furthermore, actuators such as motors must be provided somewhere in the vicinity of the hinge, leading to increased complexity and weight of the rotor blade. Therefore, in a preferred embodiment of the invention, the flap turning means comprises an inflatable chamber arranged in an interior cavity of the primary body.

A wind turbine with rotor blades equipped with embodiments of the inventive active flap can comprise a compressor assembly that is adapted to feed pressurized air into the inflatable chamber of an active flap as required. A suitable configuration of electronically controllable valves can be provided to allow the compressor to feed pressurized air to a specific active flap independently of any other active flap. Equally, a suitable configuration of electronically controllable pressure-release valves can be provided to allow release of air from the chamber of an active flap, independently of any other active flap. In this way, each active flap can be individually controlled over its entire range of motion.

Other objects and features of the present invention will become apparent from the following detailed descriptions considered in conjunction with the accompanying drawings. It is to be understood, however, that the drawings are designed solely for the purposes of illustration and not as a definition of the limits of the invention.

In the diagrams, like numbers refer to like objects throughout. Objects in the diagrams are not necessarily drawn to scale.

Figure 1:
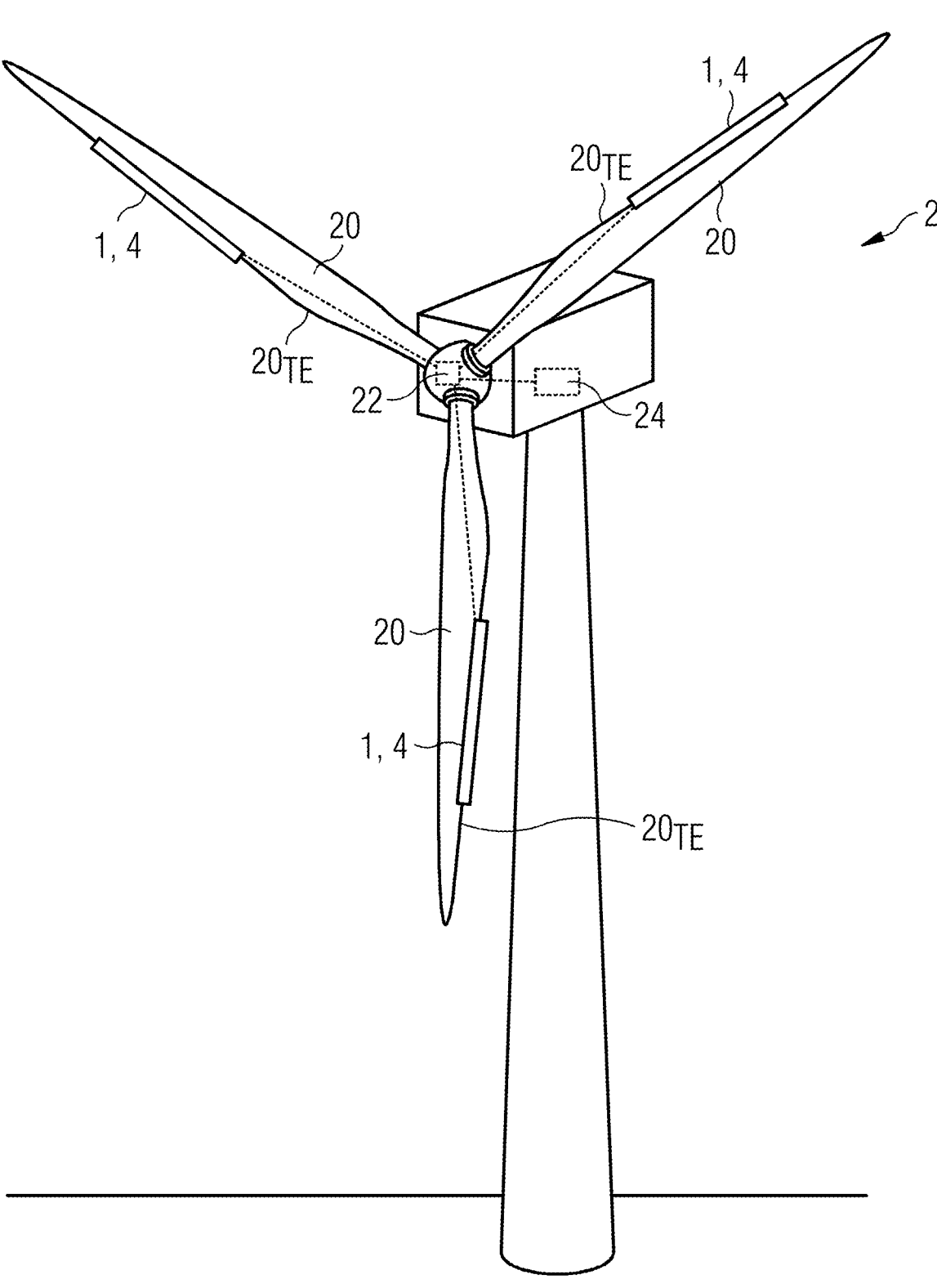
FIG. 1 shows a wind turbine with rotor blades equipped with active flaps.

FIG. 1 shows a wind turbine 2, with rotor blades 20 mounted to a hub. Each rotor blade 20 is equipped with one or more active flaps 1, 4 along a portion of its airfoil region. During operation of the wind turbine 2, the rotor blades 20 can be pitched to increase or decrease the amount of energy extracted from the wind.

In exemplary embodiments of the invention, a compressor assembly 22 can control each active flap 1, 4 independently of the other active flaps, so that each active flap 1 can be moved to a desired position between a neutral position and a maximum working position. This is done by adjusting the amount of pressurized air in an inflatable hose arranged in the interior of the active flap as will be explained below. A wind turbine controller 24 can issue appropriate commands to the compressor assembly 22, which then opens and closes appropriate valves to inflate or deflate the hoses.

Figure 2:
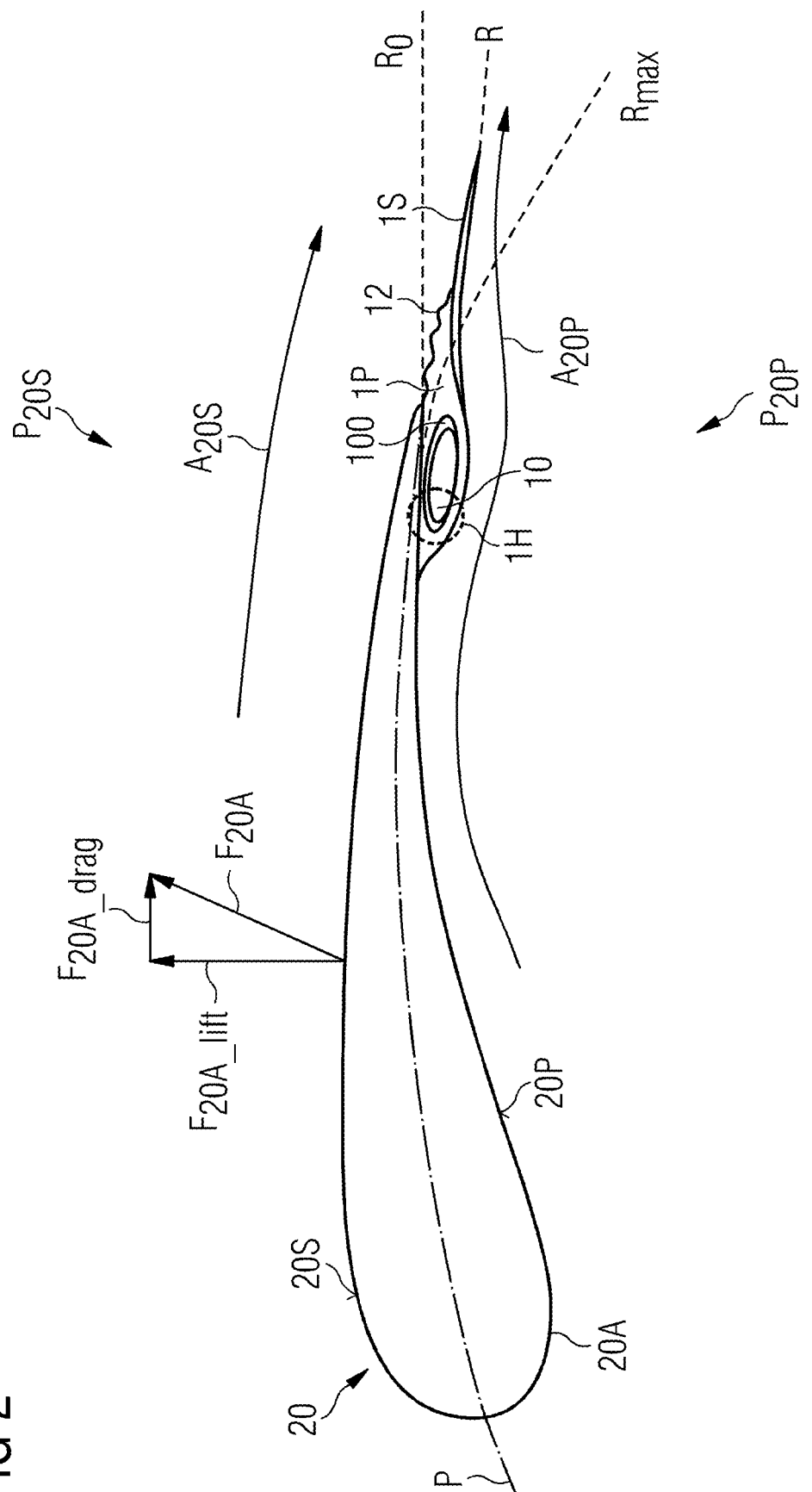
FIG. 2 is a cross-section through a rotor blade airfoil equipped with an embodiment of the inventive active flap in a first position.

FIG. 2 is a cross-section through an airfoil 20A of a wind turbine rotor blade 20 equipped with an embodiment of the inventive active flap 1. The diagram indicates a plane P that includes the chord plane of the rotor blade 20. A rotor blade airfoil gradually transitions from a wide and thick shape at the inboard region towards a narrow and flat shape at the tip end of the rotor blade, and the chord plane comprises the chord line of each possible airfoil cross-section, including the chord line 20C of the airfoil cross-section shown here.

Since a wind turbine rotor blade can be pre-bent in the flapwise direction, the skilled person will appreciate that the chord plane is not necessarily flat. The plane P divides the space through which the rotor blade 20 moves into a "suction side" $P_{20S}$ (which includes the suction surface 20S of the airfoil 20) and a "pressure side" $P_{20P}$ (which includes the pressure surface 20P of the airfoil).

The active flap 1 has been turned to a working position R as shown here, i.e. to a position within the possible range of motion bounded by a neutral position $R_0$ and a maximum working position $R_{max}$.

The active flap 1 comprises a primary body 1P and a secondary body 1S. The primary body 1P is constructed to be able to turn about a "hinge" 1H indicated by the dotted region. To this end, an inflatable hose 10 is arranged in an interior cavity 100 of the primary body 1P. When the hose 10 as shown here is inflated (for example by a suitable quantity of pressurized air from a compressor arrangement), the shape of the primary body 1P is altered and its upper surface is deflected "downwards", turning the active flap 1 to the desired working position R. This shape alteration is achieved by suitable design of the primary body 1P, for example by incorporating an elastic element 12 as shown here that extends when the hose 10 is inflated and which returns to its original shape when the hose 10 is deflated. Here, flap turning is achieved by the inflatable hose 10 and the elastic element 12.

The diagram illustrates the manner in which the airflow $A_{20S}$, $A_{20P}$ (passing over both surfaces 20S, 20P of the airfoil 20A) is guided by the active flap 1 more towards the suction side P20S (and away from the pressure side P20P), thereby achieving a large aerodynamic force $F_{20A}$ in the direction shown. As the skilled person is aware, the aerodynamic force F20A on an airfoil 20A has a lift component $F_{20A\_lift}$ and a drag component $F_{20A\_drag}$.

Usually, it is desirable for a wind turbine to generate as much power as possible, and—in addition to suitable pitch commands—the controller will issue active flap commands to move one or more active flaps 1 to working positions that help achieve a desired aerodynamic force for each rotor blade. For example, the active flap 1 of FIG. 2 can be moved to a maximum working position $R_{max}$ in which the active flap 1 makes its maximum contribution to the lift component $F_{20A\_lift}$.

Figure 3:
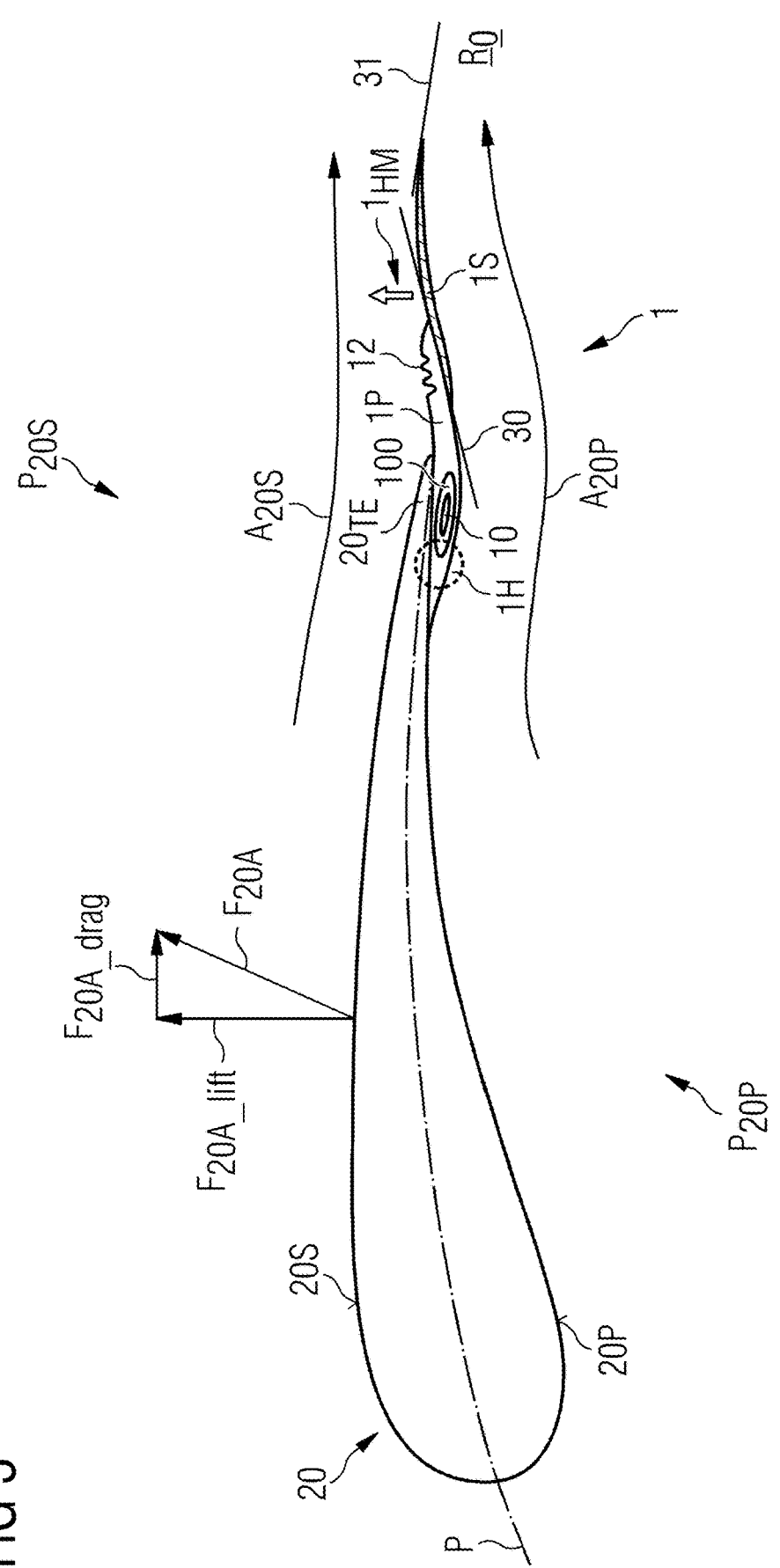
FIG. 3 is a cross-section through the rotor blade airfoil of FIG. 2, with the active flap in a second position.

In other situations, it may be necessary to minimize the aerodynamic force $F_{20A}$ on the rotor blade 20, and the controller issues control commands to return the active flap 1 to its neutral position $R_0$ as shown in FIG. 3. The hose 10 is deflated, and the suction surface of the active flap 1 moves "upwards" again. The diagram shows how the shape of the secondary body 1S guides and combines the suction-side airflow $A_{20S}$ (the airflow that passed over the suction surface of the airfoil 20A) and the pressure-side airflow $A_{20P}$ (the airflow that passed over the pressure surface of the airfoil 20A) to deflect upward at the trailing edge, in the direction of the suction side $P_{20S}$. The effect of this airflow guidance is to generate a positive hinge moment $1_{HM}$ acting on the hinge region 1H, effectively maintaining the active flap 1 in its neutral position $R_0$.

FIG. 3 also shows a mounting plane 30 at the interface between the primary body 1P and the secondary body 1S of the active flap 1. The curved shape of the secondary body 1S can be defined by the relative orientation of the mounting plane 30 and a plane 31 through the outer edge of the secondary body.

Figure 4:
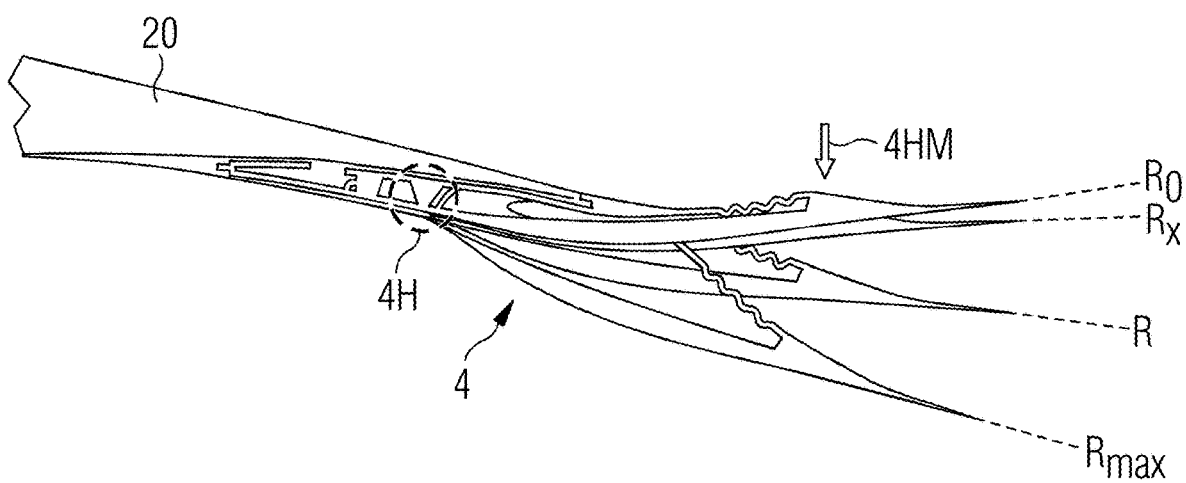
FIG. 4 shows a wind turbine rotor blade equipped with a prior art active flap.

FIG. 4 shows a similar situation in the case of a wind turbine rotor blade 20 equipped with a prior art active flap 4 of a similar design, i.e. a flexible add-on with an inflatable hose in an interior cavity. Even though the active flap 4 has been put in its neutral position $R_0$, the force of the airflow $A_{20S}$ over the rotor blade suction surface 20S can exert a negative hinge moment $4_{HM}$ on the active flap 4 which acts to deflect it from its neutral position and into a working position $R_x$. This may result in an increase in lift force $F20_{A\_lift}$ on the rotor blade 20. Besides the possibly unwanted increase in lift from this deflection, a later actuation of the active flap 4 by the wind turbine controller (for example in order to increase the power output of the wind turbine) may fail to achieve a desired blade loading, since the wind turbine controller issues control commands on the assumption that the active flap 4 is in its neutral position, and is unaware that the active flap 4 is unintentionally already in a working position $R_x$. As a result, the resultant position of the active flap 4 may be non-optimal, since it will be closer than intended to the maximum working position $R_{max}$. Effectively, the range of the prior art active flap 4 is reduced by the passive deflection $R_x$, owing to its inability to maintain its neutral position.

Figure 5:
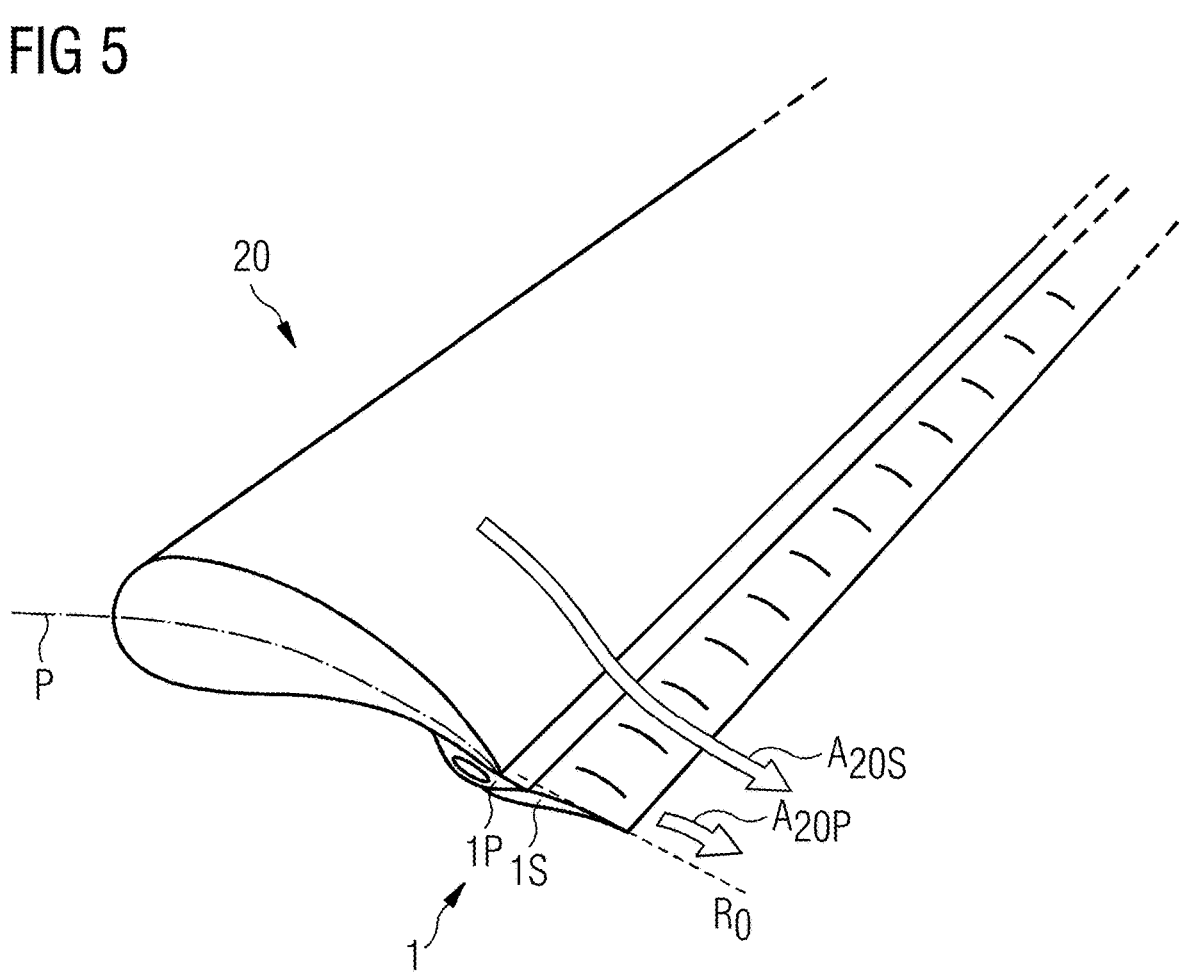
FIGS. 5-7 show further embodiments of the inventive active flap.

FIG. 5 shows a perspective view of an embodiment of the inventive active flap 1 in place on a rotor blade 20. Viewed from above, the secondary body 1S has an elongate shape and exhibits a slight convex form along its length. The cross-section through the airfoil 20A and active flap 1 clearly shows this curved shape of the secondary body 1S. The diagram also indicates the effect of the active flap 1 on the incoming airflow $A_{20S}$, $A_{20P}$ when the flap 1 is in its neutral position $R_0$ as shown here.

Figures 6, 7:
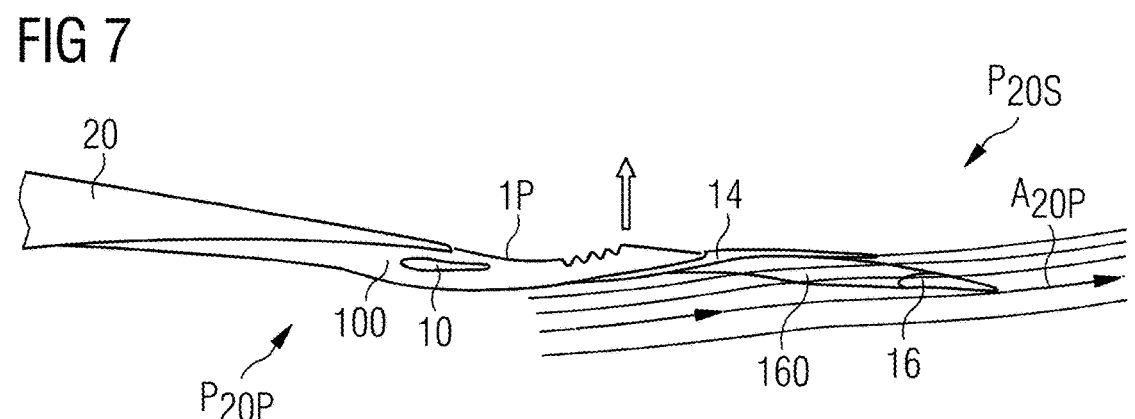

FIG. 6 shows a perspective view of a further embodiment of the inventive active flap 1 in place on a rotor blade 20. Viewed from below, the secondary body 1S comprises two parts, namely an elongate part 14 with serrations 140 along its trailing edge, and a number of small auxiliary airfoils 16.

Each auxiliary airfoil 16 is attached to the elongate part 14 by means of streamlined struts 160. FIG. 7 illustrates the effect of this embodiment on the incoming airflow $A_{20S}$, $A_{20P}$ when the flap 1 is in its neutral position $R_0$ as shown here.

A negative hinge moment may be deliberately designed into the active flap in order to avoid excessive positive hinge moment when the active flap is in its neutral position. A negative hinge moment can convey a greater control authority to the active flap and result in a faster response time when the active flap is returned to its neutral position.

Figure 8:
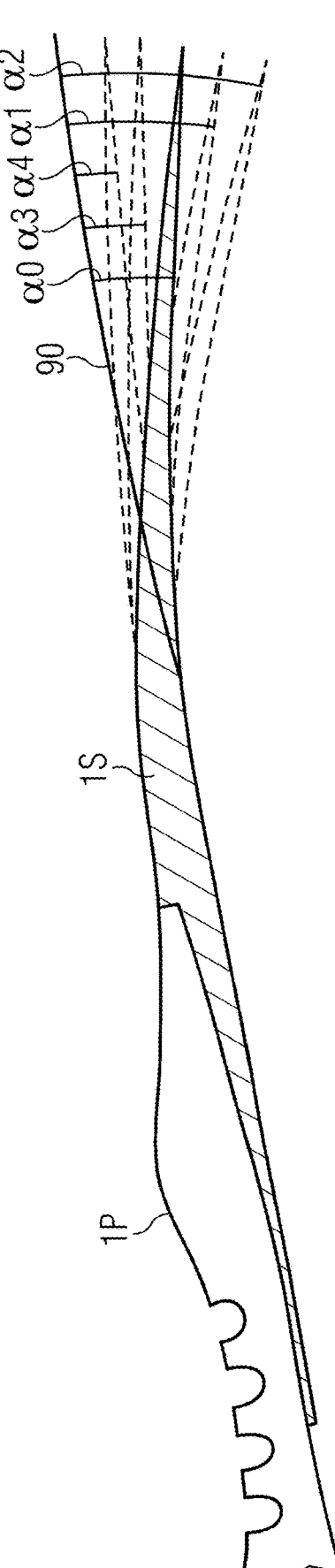
FIG. 8 and FIG. 9 illustrate the effect of adjusting the flap end angle of the inventive active flap.
Figure 9:
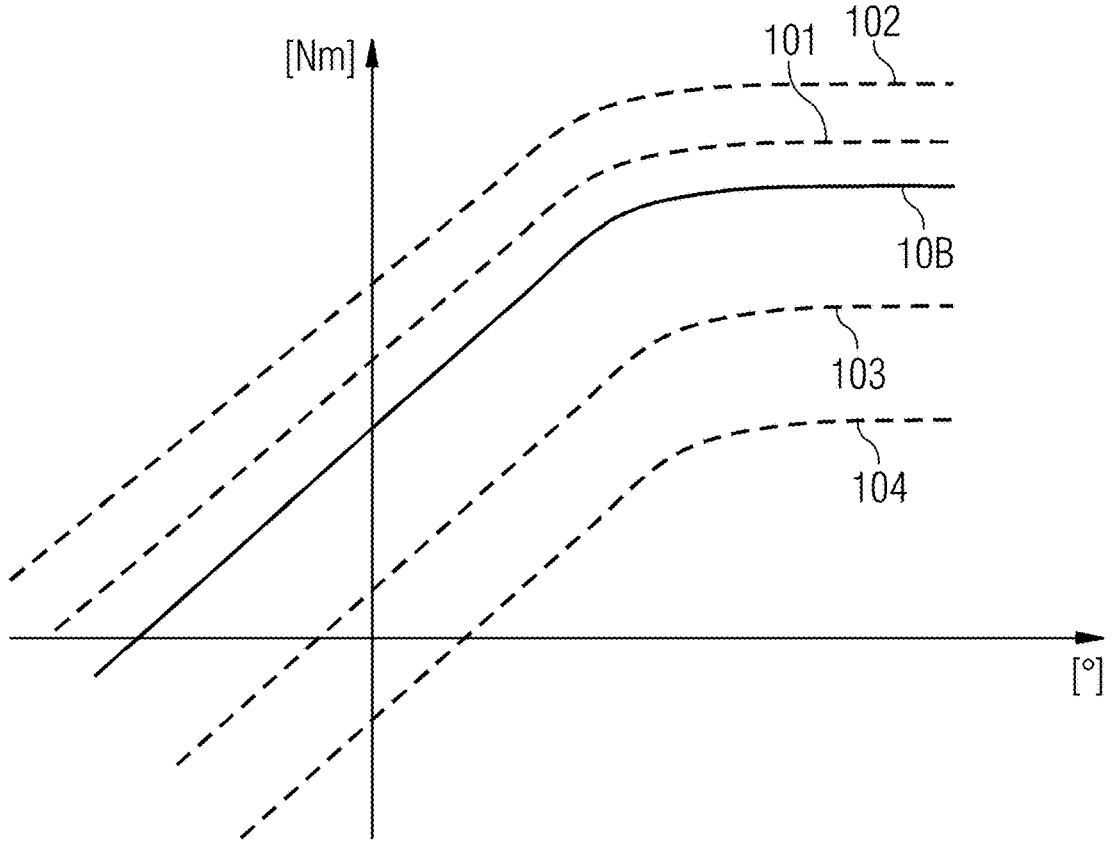

FIG. 8 and FIG. 9 illustrate the effect of adjusting the flap end angle of the inventive active flap. FIG. 8 shows an exemplary embodiment of the inventive active flap 1 in place on the trailing edge of a wind turbine rotor blade, corresponding to an embodiment as described in FIG. 3 above (only the outer portion of the primary body 1P is shown for clarity, an inflatable chamber or similar is not shown but may be assumed). The diagram indicates a reference plane 90 relative to which the flap end angle $\alpha$ is defined. The reference plane 90 may correspond to the mounting plane 30 described in FIG. 3 above. The solid outline of the secondary body 1S indicates a flap end angle do associated with a baseline hinge moment, and the dotted outlines for other positions of the secondary body 1S indicate flap end angles $\alpha_1$-$\alpha_4$ associated with other baseline hinge moments as explained in FIG. 9, which shows graphs of hinge moment (Nm) against flap deflection (degrees) for embodiments of the inventive active flap with different flap end angles. A baseline hinge moment curve 10B illustrates the relationship between hinge moment and flap deflection for a certain flap end angle do as indicated in FIG. 8. This flap end angle do may be associated without any pronounced hinge moment during operation of the rotor blade. Several exemplary hinge moment curves 101-104 illustrate the effect of altering the flap end angle. The two hinge moment curves 101, 102 above the baseline hinge moment curve 10B exhibit positive offset, i.e. the hinge moment is increased or made "more positive" by choosing a large flap end angle $\alpha_1$, $\alpha_2$. The two hinge moment curves 103, 104 below the baseline hinge moment curve 90 exhibit negative offset, i.e. the hinge moment is decreased or made "more negative" by choosing a reduced flap end angle $\alpha_3$, $\alpha_4$.

Of course, the inventive active flap can combine the effects described above. For example, at one end of its mounting length, the active flap can be shaped to exhibit a small amount of negative hinge moment. At the other end of its mounting length, the active flap can be shaped to exhibit only positive hinge moment. The shape and contours of the active flap shape can segue smoothly over its mounting length so that the transition from negative hinge moment to positive hinge moment (i.e. with a flap end angle do) occurs at a desired spanwise position of the rotor blade trailing edge.

Figure 10:
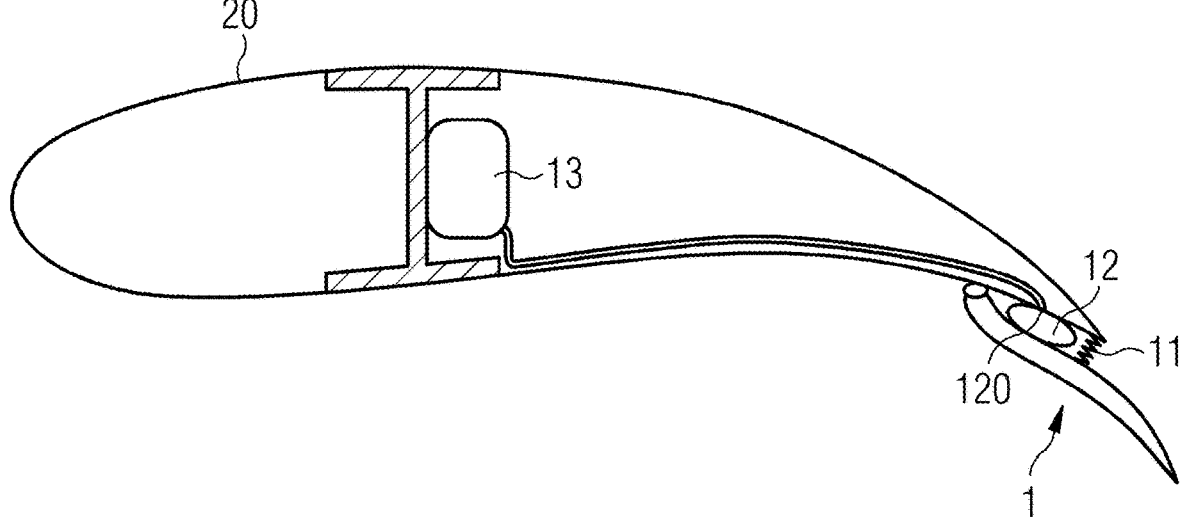
FIG. 10 shows a further embodiment of the inventive active flap.

FIG. 10 shows a further embodiment of the inventive active flap 1. Here, the flap turning means is realised as an elastic body 11—in this case a spring—which acts to place the secondary body 1S in its working position. In this embodiment, the flap turning means is "passive" in the sense that it is not actuated by a wind turbine controller. Here, the spring 11 maintains the secondary body 1S in its "maximum working position" $R_{max}$, as long as the spring is not compressed. The diagram shows an air bladder 12 with an outlet or orifice 120 whose diameter or cross-sectional area is chosen to achieve a desired damping of the spring 11. The bladder 12 may be connected to a reservoir 13 or tank in the rotor blade interior as shown here. At higher wind speeds, the force exerted on the secondary body 1S causes the spring 11 to compress. This forces air out of the bladder 12 (and, in this case, into the reservoir). The active flap 1 is compressed further as wind speed increases, and ultimately reaches its neutral position when the bladder 12 is completely emptied. The bladder 12 will refill again (drawing air from the tank 13) as wind speed decreases and the force on the secondary body decreases, allowing the spring 11 to extend again.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An active flap (1) comprising a primary body (1P) adapted for mounting to the trailing edge ($20_{TE}$) of a wind turbine rotor blade (20);

a flap turning assembly comprising an elastic element (12) comprising an enclosed interior cavity (100) and an inflatable hose (10) disposed in the interior cavity (100), the flap turning assembly adapted to turn the active flap (1) between a neutral position ($R_0$), in which the active flap (1) directs airflow ($A_{20S}$, $A_{20P}$) towards the suction side ($P_{20S}$) of the rotor blade (20), and a working position (R-$R_{max}$), in which the active flap (1) directs airflow ($A_{20S}$, $A_{20P}$) towards the pressure side ($P_{20P}$) of the rotor blade (20); wherein the flap turning assembly is configured to move about a hinge (1H) disposed adjacent to an upstream end of the interior cavity (10) from the neutral position (R0) when the inflatable hose (10) is deflated to the working position (R-Rmax) when the inflatable hose (10) is inflated, whereby a shape of the primary body (1P) is altered when the inflatable hose (10) is inflated so that an upper surface of the primary body (1P) at a downstream portion is deflected downwards and a secondary body (1S) mounted to the primary body (1P) and configured to hold the active flap (1) in its neutral position ($R_0$).

2. An active flap according to claim 1, wherein the secondary body (1S) is shaped to achieve a positive hinge moment ($1_{HM}$) about a hinge region (1H) of the active flap (1).

3. An active flap according to claim 1, wherein a suction surface of the secondary body (1S) has a convex shape.

4. An active flap according to claim 1, wherein the secondary body (1S) is an essentially rectangular band (14).

5. An active flap according to claim 1, wherein the flap turning assembly further comprises an elastic body (11) configured to maintain the secondary body in a working position ($R_{max}$).

6. A wind turbine (2) comprising at least a number of rotor blades (20) mounted to a hub; and an active flap (1) according to claim 1 mounted to the trailing edge ($20_{TE}$) of each rotor blade (20).

7. A method of operating a wind turbine (2) according to claim 6, comprising a step of actuating the flap turning assembly of the active flap (1) of a rotor blade (20) to turn that active flap (1) from a working position (R, $R_{max}$) to its neutral position ($R_0$) in order to reduce the lift force ($F20_{A\_lift}$) on that rotor blade (20);

and comprising a step of actuating the flap turning assembly (10, 11, 12) of the active flap (1) of a rotor blade (20) to turn that active flap (1) to a working position (R, $R_{max}$) in order to increase the lift force ($F20_{A\_lift}$) on that rotor blade (20).

8. A wind turbine according to claim 1, comprising a compressor assembly (22) adapted to provide pressurized air to the flap turning assembly of the active flap (1) of a rotor blade (20).

9. A wind turbine according to claim 8, comprising a controller (24) configured to issue control commands to the compressor assembly (22) on the basis of a desired active flap position ($R_0$, R, $R_{max}$).

10. The active flap of claim 1, wherein at least a portion of an upper surface of the primary body (1P) downstream of the interior cavity (100) further comprises an uneven surface that extends when the inflatable hose (10) is inflated and returns to an original shape when the inflatable hose (10) is deflated.

11. The active flap of claim 10, wherein the uneven surface comprises an expandable accordion shaped configuration.

12. An active flap comprising:

a primary body (1P) adapted for mounting to the trailing edge ($20_{TE}$) of a wind turbine rotor blade (20);

a flap turning assembly comprising an elastic element (12) comprising an enclosed interior cavity (100) and an inflatable hose (10) disposed in the interior cavity (100), the flap turning assembly adapted to turn the active flap (1) between a neutral position ($R_0$), in which the active flap (1) directs airflow ($A_{20S}$, $A_{20P}$) towards the suction side ($P_{20S}$) of the rotor blade (20), and a working position (R-$R_{max}$), in which the active flap (1) directs airflow ($A_{20S}$, $A_{20P}$) towards the pressure side ($P_{20P}$) of the rotor blade (20);

a secondary body (1S) mounted to the primary body (1P) and configured to hold the active flap (1) in its neutral position ($R_0$),—wherein the secondary body (1S) comprises an auxiliary airfoil (16).

13. The active flap according to claim 12, wherein the secondary body (1S) is an essentially rectangular band (14) and comprises an auxiliary airfoil (16) mounted to the pressure surface of the essentially rectangular band (14).

14. The active flap according to claim 12, wherein the auxiliary airfoil (16) is an active device realized to alter the direction of airflow over its surfaces.

\* \* \* \* \*